Feb. 20, 1923.
F. D. MAYER ET AL.
MACHINE FOR PLACING AUTOMOBILE TIRES ON RIMS.
FILED AUG. 9, 1918.
1,445,784.
7 SHEETS—SHEET 5.

Inventors
Franc D. Mayer
Alpha B. Vance
By Daniel A. Brennan
Attorney

Patented Feb. 20, 1923.

1,445,784

UNITED STATES PATENT OFFICE.

FRANC D. MAYER AND ALPHA B. VANCE, OF CHICAGO, ILLINOIS, ASSIGNORS TO THE ESSENKAY PRODUCTS COMPANY, OF CHICAGO, ILLINOIS, A CORPORATION OF ILLINOIS.

MACHINE FOR PLACING AUTOMOBILE TIRES ON RIMS.

Application filed August 9, 1918. Serial No. 249,071.

*To all whom it may concern:*

Be it known that we, FRANC D. MAYER and ALPHA B. VANCE, citizens of the United States, residing at Chicago, county of Cook, and State of Illinois, have invented new and useful Improvements in Machines for Placing Automobile Tires on Rims, of which the following is a specification.

This invention relates to machines for placing automobile tires on rims.

An object of the invention is to provide a machine for firmly seating automobile tires on rims of automobile wheels, and particularly tires which are to retain, after their attachment to the rim, the same cross-section which they have prior to said attachment.

The ordinary pneumatic tire is placed on the rim while being deflated, and the cross-section necessary for holding the rim and tire in firm connection with each other is attained after the tire has been seated, through inflation of the tire. The defects inherent to the pneumatic tire, its low resistance against pointed obstacles, the possibility of undesired reduction of air pressure within the tire, have led to the development of a resilient substitute tire in which the place of the air cushion is taken by a cushion of suitable resilient material inserted into the tire before the same is firmly seated on the rim.

An object of the present invention is to provide a machine in which tires filled with any one of these resilient cushions may be secured to rings of different cross-section, and it is also an object of the invention to provide a machine in which tires of different cross-sections and tires of different diameters may be placed upon their suitably selected rims.

For this purpose it is an object of the invention to provide a centering device adaptable to rims and tires of different diameters combined with seating mechanisms which force the tire into engagement with the rim. This introduction of the tire into the rim may be accomplished by relative movement of the seating mechanisms and tires or rims, including a mechanism for rotating the tire while the seating mechanisms are held substantially stationary.

Other objects of the invention are directed to the provision of mechanisms for gradually increasing the operative pressure of the seating mechanisms upon the tires, for locking the centering device, and for uniformly adjusting the centering device in all of its portions with respect to the rims.

The general objects and purposes of the machine above stated and other objects and purposes hereinafter described, are attained with improvements in mechanism the preferred forms of which are illustrated in the accompanying drawing, wherein:

Fig. 12 is a sectional view through the tire advance roller and its adjustable support;

The machine frame 1 comprises a base having near its bottom an enlarged base plate 2, which may be anchored to the floor of the room, and near the top a boxlike structure 3, serving as a support for the principal bearings, and also serving as a support for a number of brackets which carry the various attachments for the machine.

The structure 3 of the frame has an annular inner wall 4 and a top wall 5, above which rests a spider 6, comprising a plurality of arms 7, and a rim 8, the lower edge of which is provided with a bevel gearing 9. Above the hub of the spider 6 a hub 10 of a bevel gear wheel is disposed, which wheel has upwardly curved arms 11 and a rim 12 with bevel gear teeth. The hub of this bevel gear is keyed to a vertical shaft 13, which projects into the box structure 3, and is journaled within a hollow shaft 14, which serves as a support for the bevel gear spider 6. A bushing 15, made of bronze or other suitable material, surrounds the hollow shaft 14, and serves as bearing for the same. The hollow shaft 14 is provided near its bottom end with a thrust flange 16, which engages a downwardly projecting portion 17 of the inner wall 4.

The rim of the spider 6 carries in opposition to the bevel teeth 9 a plurality of bearings 18, equally spaced from each other and fastened to the rim by means of the screws 19. These bearings support spindles 20, consisting of a straight or outer portion 21 and an inner threaded portion 22. Each threaded portion 22 is engaged by a nut 23 in the shape of a bevel pinion, which is in engagement with the bevel gear teeth of the rim 12.

The bearings 18 have near their inner ends an upwardly directed lug 24 (Fig. 9), in which a locking pin 25 is slidably secured. This locking pin enters a longitudinal slot 26 of the pertaining spindle 20, and normally holds each spindle against rotation. A set-screw 27, entering the lug 24 and adapted to impinge upon the pin 25, prevents accidental removal of the pin 25 from adjusted position.

Figure 9:
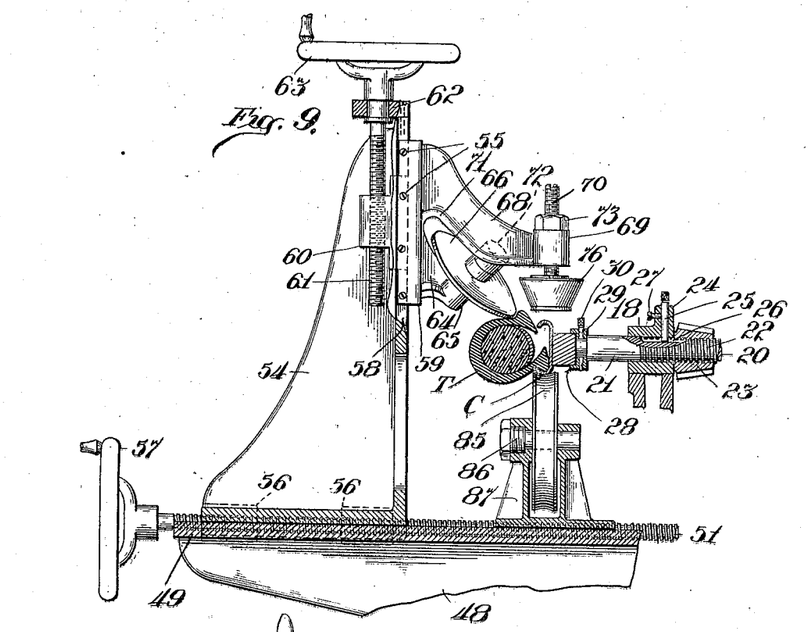
Fig. 9 is partly side elevation and partly section of an attachment for securing a filled tire to a clincher rim.

Each spindle is provided on its outer end with a rim-carrying, arcuate shoe 28, mounted removably on a reduced portion or neck 29 of the spindle. The shoes 28 have substantially channel shaped cross-section, and may be provided in the bottom of the channel with a leather lining (not shown) or some similar cushioning material to prevent injury to the felly F of the rim. The shoes are readily exchangeable and removable from the spindles 20 upon withdrawal of locking pins 30, which are tapering and which project through the body of the shoe 28 and through the reduced portion 29 (Fig. 9).

The bevel pinions 23 are held against outward axial displacement on the screws 22, owing to their engagement with the individual bearings 18, and they are in common held against axial displacement towards the center line of the machine by means of a pressure ring 31, which has a plurality of upwardly projecting lugs 32, suitably spaced and provided with bores 33, through which the threaded portions 22 of the spindles pass.

The uniform radial displacement of all of the rim supports 28, resulting in the centration of the rim in the machine, is effected by rotation of the bevel gear rim 12. The actuating mechanism for the centering device is mounted in the base, and comprises a bearing bracket 34, which supports a horizontal shaft 35, carrying on its outer end a hand wheel 36 and on the inner end a bevel pinion 37. When the bevel pinion 37 is in engagement with a bevel gear 38, keyed to the foot end of the shaft 13, and when the hand wheel 36 is rotated, the shaft 13 and the bevel gear rim 12 will be rotated, and the bevel pinion nuts 23 will convert their rotary movement into a uniform axial movement of the spindles 20.

Figure 3:
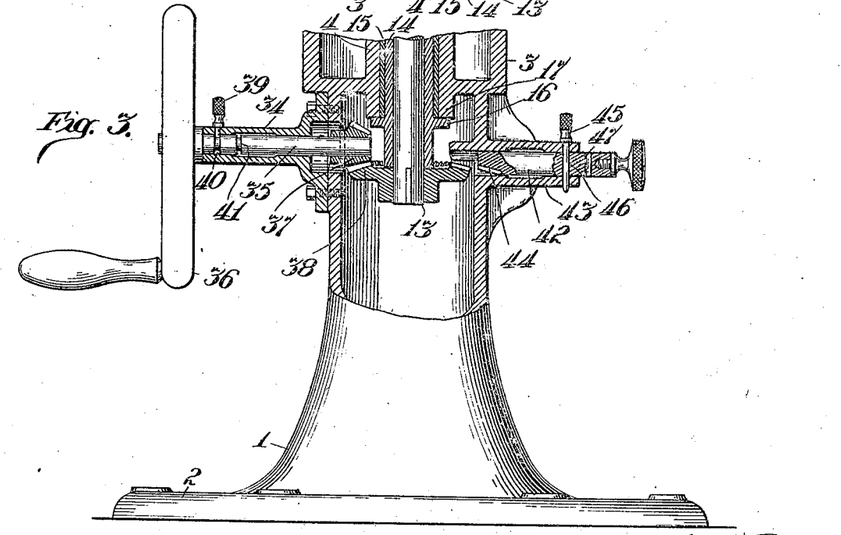
Fig. 3 shows, on a larger scale, partly in section and partly in elevation, the base of the machine with the drive of the centering device and the lock for the centering device.
Figure 4:
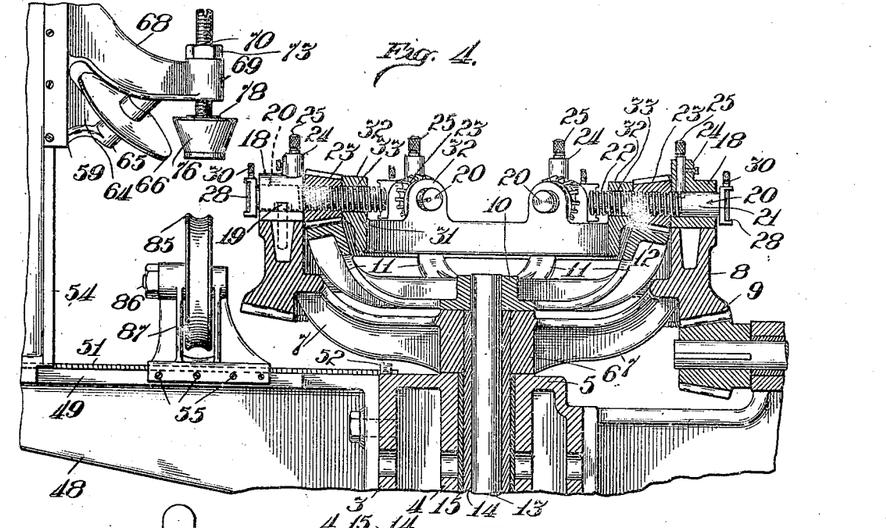
Fig. 4 is, in section and partly in elevation, the centering device and the rim carrier combined with the transmission for the rim carrier.

The shaft 35, which is slidable and rotatable in the bracket 34, may be locked in operative or inoperative position by means of a pin 39, removably inserted in an opening of the bracket 34 and adapted to enter one of the two annular grooves 40, 41 on the shaft 35. In the position illustrated in Fig. 3, the spindle 35, therefore, is shown in operative engagement with the bevel gear 38 of the shaft 13.

A device for locking the centering shaft 13 against rotation includes a rod 42, slidably mounted within a sleeve extension 43 in the base of the machine, and having at its forward end a bevel tooth 44, adapted to engage and lock the gear teeth on the wheel 38. Upon withdrawal of the pin 45, which passes through a bore 46 in the rod 42, this rod may be moved inwardly and may be secured in its locking engagement with the bevel gear 38 through reinsertion of the locking pin 45 in the bore 47 of the rod.

Brackets 48 for supporting the various attachments may be removably fastened to the frame 3, preferably at such height that the upper surface of the brackets is in a plane with the top walls 5. The horizontal supporting plates 49 of the brackets are preferably undercut on the side edges to prevent tilting of the attachments placed thereon. Some of these brackets may be provided with bearings 52 for a spindle 51, wherein the spindle is held against axial displacement.

The attachments to be placed on the brackets 48 vary in accordance with the rim and tire structure. They comprise brackets 54, having a bottom surface with an undercut groove so as to be slidably seated on the undercut top plate 49 of the supporting brackets 48. They may be locked in adjusted position thereon by means of set-screws 55; they may also be provided with tapped lugs 56, through which the spindle 51 extends. Upon rotation of the spindle 51 through hand wheel 57, the brackets 54 may be radially adjusted with respect to the axis of the machine.

The front face of each bracket 54 has vertical guideways 58, also preferably undercut, for supporting a tool carrying slide 59. This slide is equipped with a tapped lug 60, through which a spindle 61 extends; the spindle is rotatably supported in a bearing 62, and is held against axial movement therein. Through rotation of a hand wheel 63, the slide 59 may be raised or lowered with respect to the rim and tire placed on the machine. After suitable adjustment the slide may be locked by set-screws 55, impinging against the guideways 58 of the attachment bracket.

Figs. 9 to 12 illustrate in detail attachments for the insertion of a tire T, provided with clincher beads, into a clincher rim. The tool carrying slide 59 is provided with two inclined projecting arms, the lower arms 64 terminating in a bearing 65 for a crimping wheel 66, which is mounted on a suitable shaft 67, and the upper arm 68 terminating in an approximately vertical nut 69 for a screw 70. The arm 68 also has a lateral flange 71 (Fig. 10), which ends in an upper bearing 72 for the shaft 67 of the crimping wheel 66. The plane of the crimping wheel 66 is askew with respect to the axis of the tire.

The screw 70 can be adjusted vertically in the nut 69, and may be held in adjusted position by a lock nut 73. The foot portion of the screw 70 is formed by a cylindrical head 74, which is flared at 75, and which carries loosely mounted thereon a tire advance roller 76, shown as a substantially conical roller with a central recess 77, in which another nut 78 is mounted on the screw 70 to urge the lower face of the roller 76 into engagement with the flared portion 75 of the screw.

Figures 10, 11:
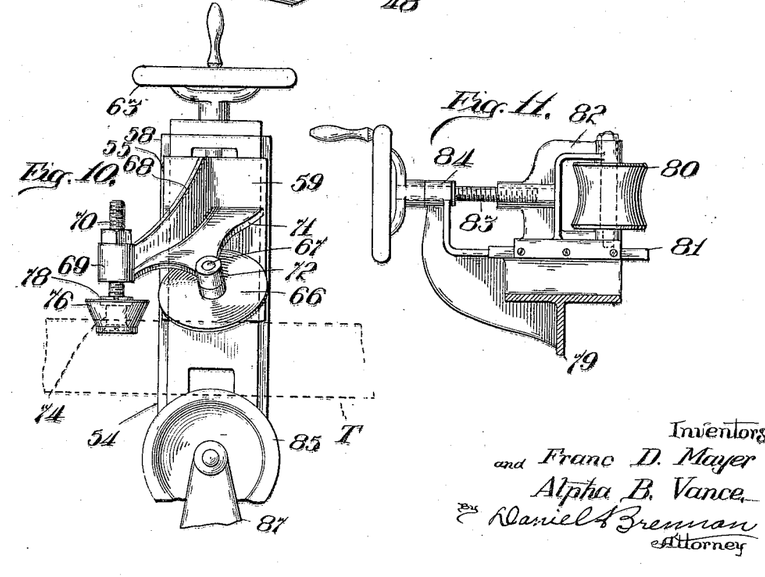
Fig. 10 is a front elevation of the same attachment.
Fig. 11 is a top plan view of the follow roller and the bracket adjustably supporting the same.

The tool carrying slide 59 may also have a lateral extension 79, in which a follower roller 80 is rotatably mounted (Fig. 11). The roller supporting bracket 82 may be adjusted in a horizontal plane on the guideway 81 by a spindle 83, which is rotatable in a rigid bearing 84 of the extension 79. Vertical adjustment of the tool carrying slide 59 therefore may bring the roller 80 into the plane of the tread portion proper of the tire, and the roller 80 may then be advanced radially into more or less firm engagement with said tread portion.

A support for the rim, in approximate opposition to the point in which the wheel 66 engages the tire, is provided by means of a supporting roller 85, mounted on the shaft 86, which is secured in bearings of a bracket 87, also slidably mounted on the guideways 49 of the supporting bracket 48. The supporting roller 85 preferably has a groove in its circumference corresponding to the curvature of the bead flange $f$ on the clincher rim C. Different rollers 85 may be used for different sized rims.

In the attachment of tires to clincher rims and other rims, the "pinching" of the tire beads on the rim is prevented by a tire flap P. The introduction of this flap prior to the insertion of the filled tire in the rim and the operation of forcing the tire itself into the rim is facilitated by a tire flap attachment bracket which may be brought into operation upon the tire prior to operation of the described crimping wheel attachment. This tire flap attachment (Figs. 5 and 6) includes the bracket 54 and a tool carrying slide 59, on which, through arms 88, a sleeve 89 is mounted so as to project at an angle to the center line of the machine. This sleeve 89 contains a plurality of axle and thrust ball bearings 90, 91 for a stylus 92, having a shank 93, which is supported within the sleeve. It is held in position by a washer 94 and by nuts engaging a threaded portion of the shank.

An attachment for inserting a different tire S, of suitable cross-section, into a "straight side" rim R, comprises a bracket 54, which supports two tool carrying slides 59 (Fig. 7), each of which has arms terminating in bearings 95 for a crimping wheel 96. A spindle 97, having oppositely directed threads in different portions, engages the nuts 60 on the slides, so that upon rotation of the spindle 97 the slides 59 will be moved simultaneously and uniformly in opposite direction.

For tires T, mounted on "quick detachable" rims Q, the attachment bracket 54 (Figs. 13 and 14) supports a slide 100 on its vertical face 101. The slide 100 is adjusted vertically by a screw spindle 102, which is rotatably, but not slidably, secured in a lug 103, the spindle entering a suitable tapped aperture of the slide 100. The slide is provided with three angularly spaced bosses 104, which serve as bearings for short shafts 105, on which the crimping wheels 106 are loosely mounted.

The drive of the machine shows, by way of example, a bracket 110, having on its upper surface a bearing sleeve 111, in which a shaft 112 is rotatably supported. The inner end of the shaft 112 carries a bevel gear 113, which is in mesh with the bevel gear 9 of the spider 6.

Two loose pulleys 114 are mounted on the shaft 112. One of said pulleys may be driven by a straight belt, while the other one may be rotated by a crossed belt drive so as to reverse the direction of the shaft 112 when brought into driving engagement therewith. The hubs of the loose pulleys have clutch faces 116. A clutch 115, slidably keyed to the shaft between the pulleys, has an annular groove 117, which is engaged by a bifurcated lever 118, pivoted to the end of the bracket 110. The other arm of the lever 118 is connected by a rod 119 with an arm 120, rigidly secured to the shaft 121, which also carries the double arm treadle lever 122. Normally the clutch 115 is in a central position between the pulleys 114, so that the pulleys rotate loosely upon the shaft 112 without rotating the same. Upon depression of one or the other of the treadles on the arm 122, the clutch is brought into engagement with one or the other of the pulleys 114; and as the pulleys continue to rotate, this rotation is transmitted to the shaft 112, and from this shaft through the bevel gear 113 to the spider 6, on which the arm is firmly secured by the rim supports 28.

Figure 18:
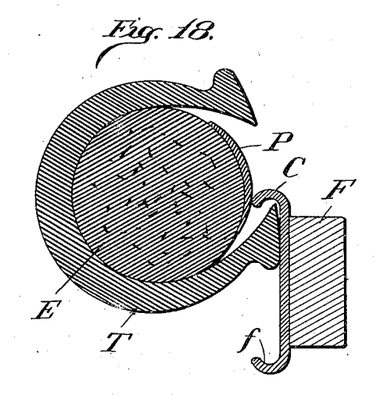

The operation of the machine in connection with various rim shapes and under utilization of the different attachments described, is about the following:

The clincher rim C together with a felly F may be placed upon the supporting rollers 85, which have been previously adjusted at equal distance from the axis of the machine. Through rotation of the hand wheel 36 the centering device is actuated, and the various rim supports 28 are displaced radially outwardly until they firmly engage the felly and hold the same centrally with respect to the machine. The tire casing T is then laid about the rim, as shown in Fig. 18, in which position the tire can be filled with the resilient material E. Subsequent to the introduction of the filler a flap or flaps P are placed on the inwardly directed surface of the material E.

Figure 19:
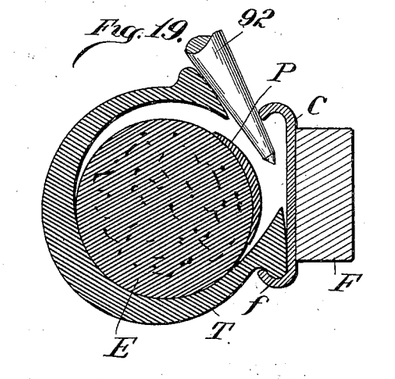
Figure 20:
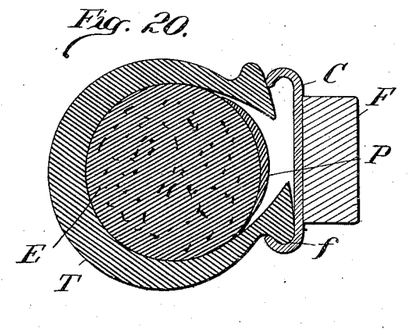
Figure 21:
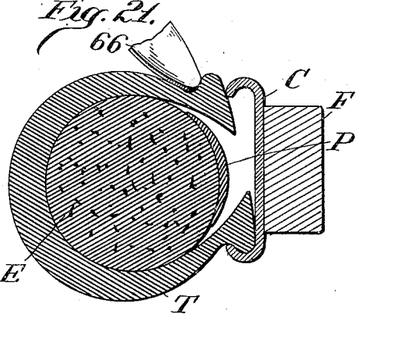
Figure 22:
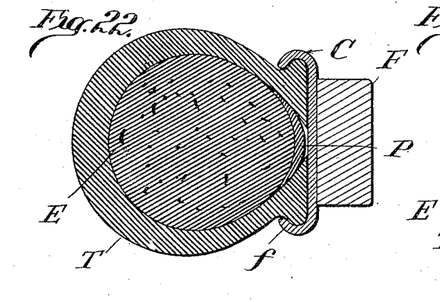
Figure 23:
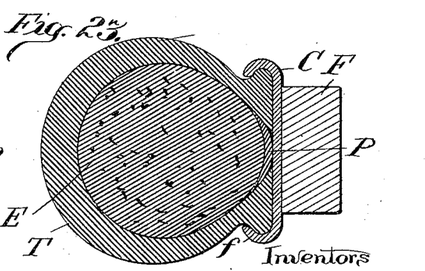

The introduction of the flap is facilitated by use of the stylus 92, and after this operation the stylus is pressed into the space between the rim C and the bead of the tire T (Fig. 19), whereby, upon rotation of the partly assembled structure in this position, the stylus will force the tire down until the lower bead rests on the lower flange $f$ of the rim C. Upon withdrawal of the stylus 92 the tires will then occupy the position shown in Fig. 20. The crimping wheel 66, supported by the tire advance roller 76, is then brought into operation, the wheel entering the groove near the upper bead (Fig. 21), and the roller (not shown) acting on a circumferential portion of the tire near the tread. The machine is rotated until, under the action of the crimping wheel 66 and of the advance roller 76, the upper bead of the tire is forced through downward adjustment of the slide 59 into the position shown in Fig. 22. The follower roller 80 may then be forced into engagement with the tread surface of the tire until the tire T, filler E, and flap P are firmly seated (Fig. 23). This operation will effect a uniform distribution and equalization of the tire pressure over the whole rim, as the roller 80 is gradually advanced in radial direction in contact with the tire.

Figures 5, 7:
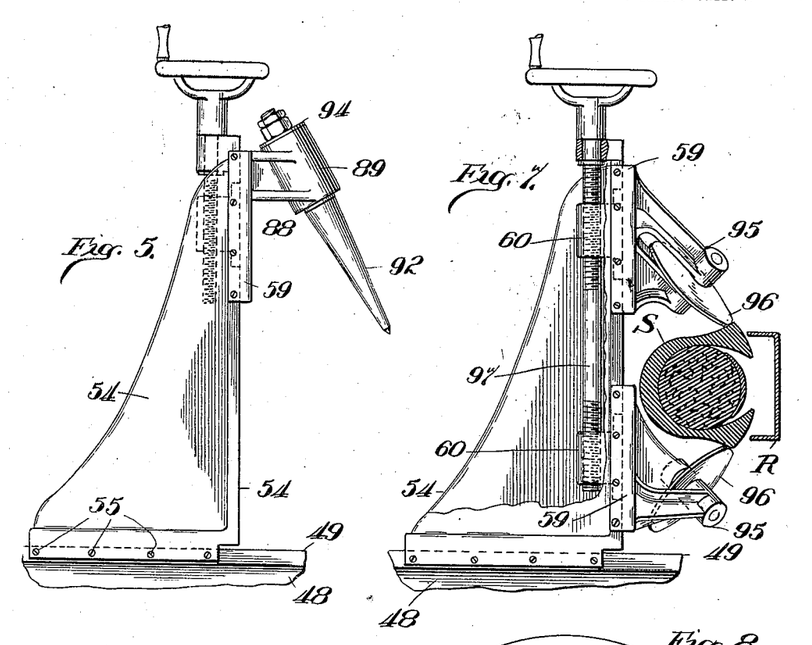
Fig. 5 is a side elevation of a clincher flap attachment.
Fig. 7 illustrates, partly in section and partly in elevation, the attachment for a so-called straight side rim and tire.
Figures 6, 8:
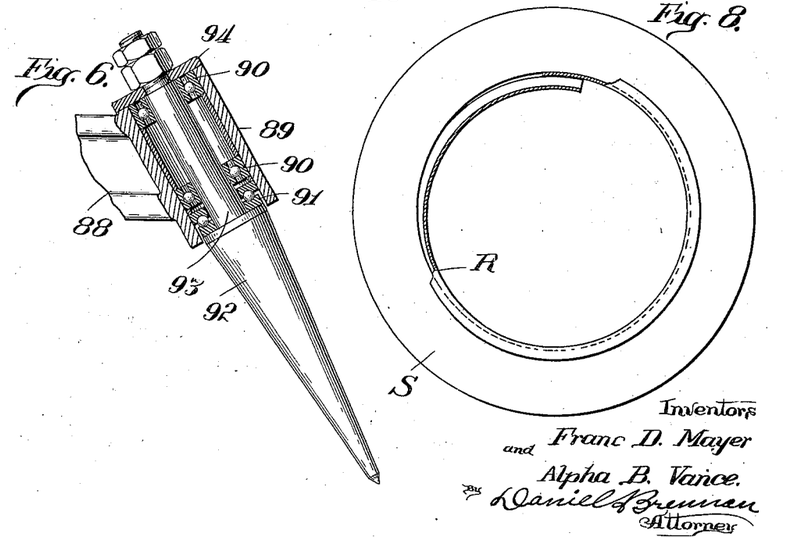
Fig. 6 is partly side elevation and partly section of the stylus and stylus support of the clincher flap attachment.
Fig. 8 is a top plan view of a tire and a straight side rim, the rim being partly shown in section.

For the insertion of a tire S into a straight side, split rim R (Figs. 7 and 8), the attachments are first equipped with the filler material E and flap. The rim R is then brought into contact with the inner circumference of this tire (Fig. 8), the ends of the split rim R then being in overlapping relation. The combined tire and rim are now placed in the machine, and through actuation of the centering device the shoes 28 are brought into firm engagement with the inner surface of the rim R (or with a felly which may be held against the rim). The centering device is then locked by advancing the locking bolt 42 and introducing the pin 45 into the opening 47. Attachments, as illustrated in Fig. 7, having crimping wheels 96, are on all of the brackets 48 and the crimping wheels are brought into engagement with the tire S. Through rotation of the spider 6, the pinions 28 will be rotated about their axes, the spider 11 being locked, however, against rotation about the center of the machine. This will cause radial advance of the rim supporting shoes 28, so that the split rim will be expanded until the ends have come to abutment, in which position they can be locked by a suitable device not shown. If, then, the centering drive is released and the machine again rotated, while the crimping wheels 95 are forced against the tire, the latter will be gradually pressed into the interior of the rim R.

Figure 1:
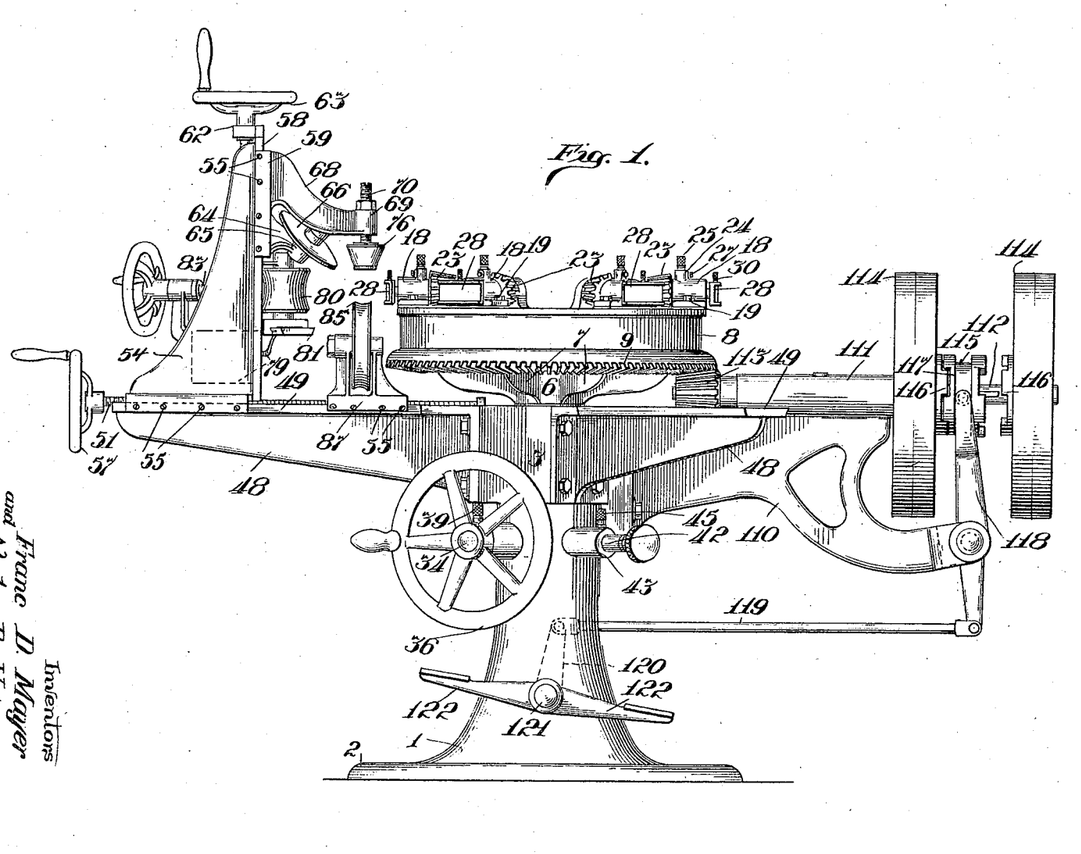
Fig. 1 is a side elevation of the complete machine.
Figures 2, 14:
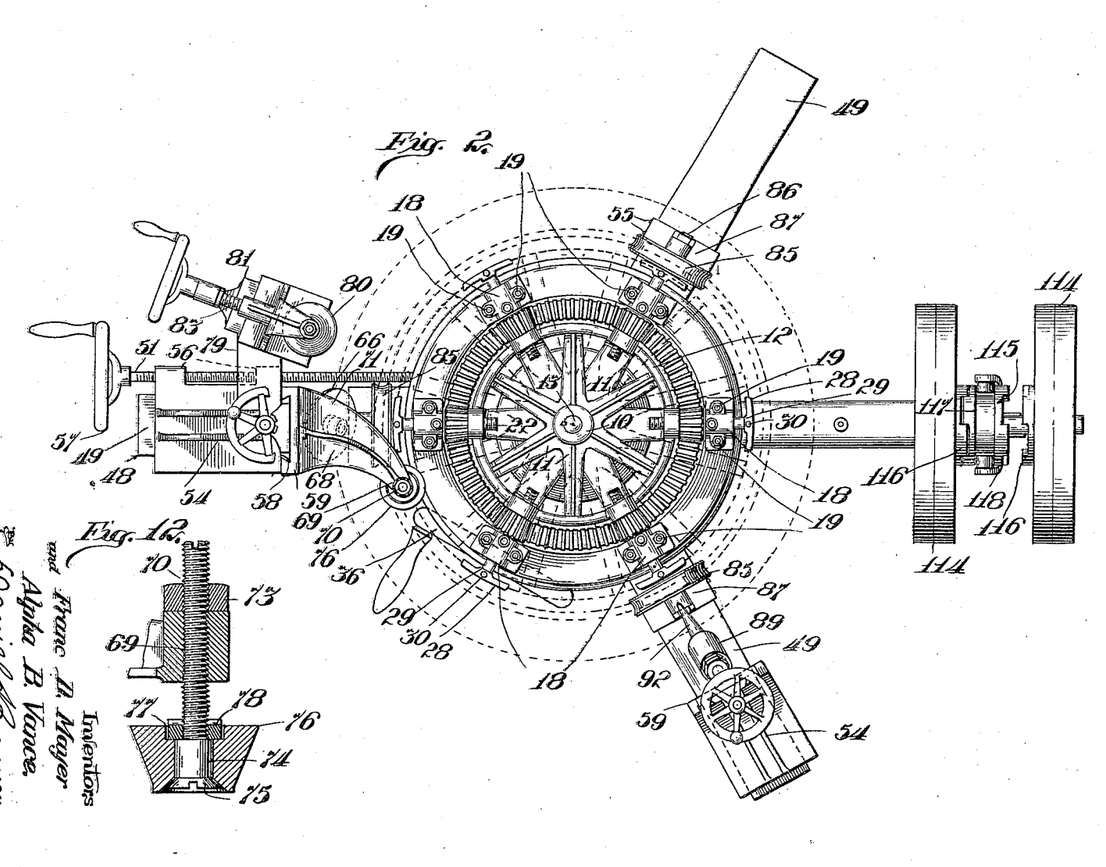
Fig. 2 is a top plan view of the same.
Fig. 14 is a front elevation of the same attachment.
Figures 13, 14, 15, 16, 17:
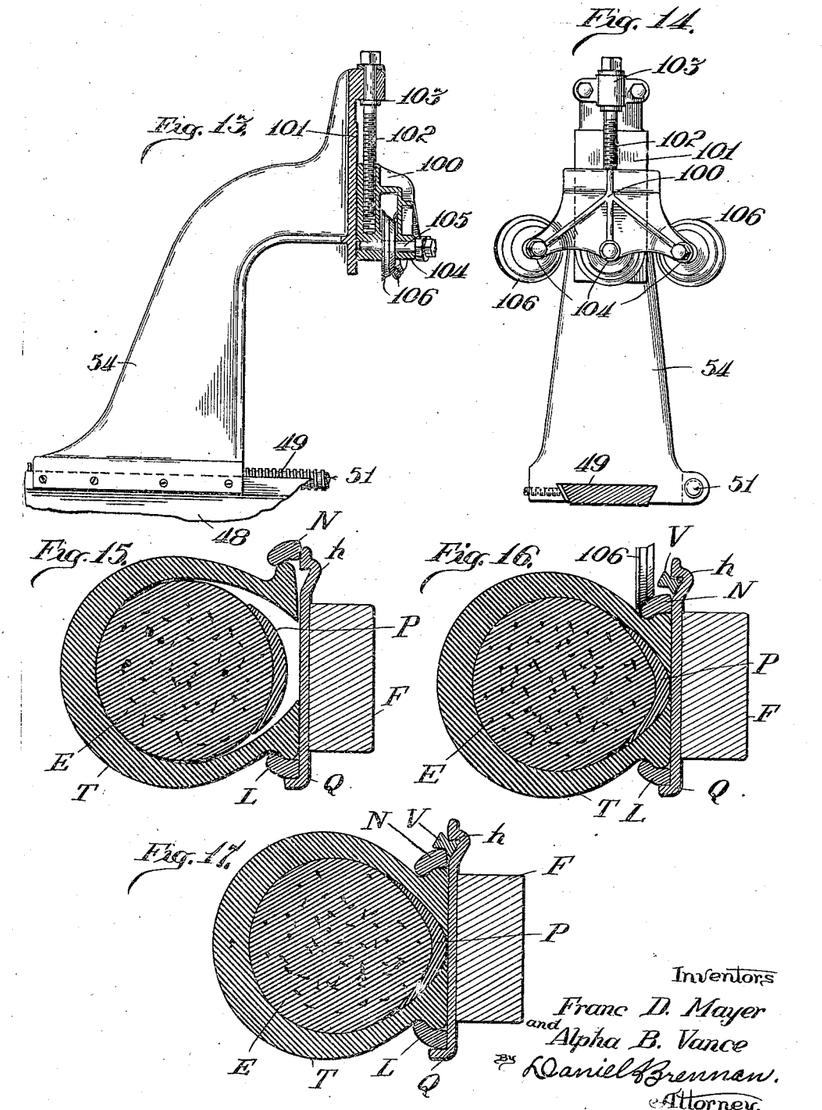
Fig. 13 is a side elevation, partly section, of an attachment for so-called "quick detachable" rims.
Figs. 15–17 inclusive illustrate, in diagrammatic sections and on a larger scale, the various successive steps for introducing and locking a filled tire into a "quick detachable" rim, and Figs. 18–23 inclusive show the various steps, in similar sectional diagrams, for inserting a filled tire into a clincher rim.

Figs. 13–17 illustrate the attachment of a filled tire to a so-called "quick detachable" rim. In this operation the brackets 48 of the machine carry devices, as illustrated in Figs. 13 and 14, at a suitable distance from the center line. After having inserted the filling material E into the tire casing T, a holding ring L is inserted into the rim Q and the lower bead of the tire is placed against this ring L. This structure, including the tire T, filler E, ring L, rim Q, and felly F, is then placed in the machine, and through the centering device the rim supporting shoes 28 are brought into engagement with the felly F. A floating ring N is then placed on the top bead of the tire (Fig. 15), and under rotation of the machine the rollers 106 are gradually forced downwardly into engagement with the floating ring, until the bead and floating ring N are about in the position illustrated in Fig. 16. A double-wedge shaped locking ring V is then inserted, when the machine is stopped, by introducing one end of this split ring V under one of the rollers 106, which has been slightly raised from engagement with the ring N. After having grasped the locking ring between the crimping wheel 106 and the holding flange $h$ of the rim Q, the machine is started again, and at the same time the pressure on the rollers 106 is gradually released by manipulation of the spindle 102. The resiliency of the tire T will force the floating ring N into the notch of the locking ring V, while the opposite notch of the ring V is grasped by the holding flange $h$ of the rim Q (Fig. 16).

The machine is not only adapted for the attachment of tires to rims, but it may also be used for the detachment of the rims from tires whenever this should become necessary, and for the removal of tires from their rims the operations may be carried out in a sequence reversed to that described above.

We claim—

1. In a machine for applying a tire to a rim, the combination of a plurality of spindles having threaded portions, a gear to which said spindles are secured, nuts engaging the threaded portions of said spindles, and a means common to all of said nuts for rotating the same, said nut rotating means being operable independently of said gear and rotatable together with said gear.

2. In a machine for applying a tire to a rim, the combination of a plurality of rim supporting spindles having threaded portions, nuts engaging the threaded spindle portions, a gear to which said spindles are secured, means for rotating said nuts, a member common to all of said nuts for rotating the same, and means for holding said member against rotation, said nuts being operable when said member is locked against rotation.

3. In a machine for applying a tire to a rim, the combination of a plurality of spindles having threaded portions, pinions loosely mounted on said threaded portions, a rotary carrier common to said spindles, and a gear in permanent engagement with said pinions and co-axial with said common carrier adapted to rotate said pinions and to displace said spindles in axial direction with respect to said pinions.

4. In a machine for applying a tire to a rim, the combination of a plurality of rim supporting spindles having threaded portions, pinions on said threaded portions, a common circular carrier for said spindles, a common means coaxial with said carrier for turning said pinions, and a gear for actuating said carrier.

5. In a machine for applying a tire to a rim held on rim supporting spindles, the combination of a gear train including a driving gear and a spindle carrying gear with a second gear train including a spindle extending gear common to all said spindles, and a plurality of gears each individual to a certain spindle.

6. In a machine for applying a tire to a rim held on rim supporting spindles, the combination of a gear train including a driving gear and a spindle carrying gear, with a second gear train including a spindle actuating gear common to all spindles, a plurality of gears each individually associated with one of the spindles, and independent driving means for said second gear train.

7. In a machine for applying a tire to a rim held on rim supporting spindles, the combination of a carrier common to all spindles, means operative by rotation of said carrier for radially adjusting said spindles, and positively operable means independent of the tire for rotating the carrier with the tire thereon.

8. In a machine for applying a circular tire to a rim, the combination of a plurality of rim supporting spindles having threaded portions, pinions on said threaded portions, a common circular carrier for said spindles, a common means coaxial with said carrier for turning said spindles, and a gear for actuating the carrier.

In testimony whereof we affix our signatures in the presence of two witnesses.

FRANC D. MAYER.
ALPHA B. VANCE.

Witnesses:
DANIEL A. BRENNAN,
WM. A. McMINFORD.